2,896,716
PLUGGING FORMATIONS WITH ASPHALT

James Wilburn Spurlock, Tulsa, Okla., assignor to Pan American Petroleum Corporation, Tulsa, Okla., a corporation of Delaware No Drawing. Application June 6, 1958
Serial No. 740,202

7 Claims. (Cl. 166—32)

This invention relates to decreasing the permeability of formations penetrated by wells. More particularly, it relates to plugging gas-producing zones of oil wells.

Several processes have been proposed for plugging off gas entering oil wells. For example, a solution of asphalt in a solvent such as carbon tetrachloride has been used. Dilution of the solution by gas-dissolving in the solution causes precipitation of some of the asphalt. The principal disadvantage of methods using asphalt solutions lies in the limited amount of asphalt in solution. Only a small portion of the asphalt can be precipitated by most processes. The degree of plugging is correspondingly small. In addition, it has been found that a small amount of residual oil in the gas zone greatly decreases the degree of plugging by some asphalt solutions.

With the above problems in mind, an object of this invention is to provide an improved process for plugging formations penetrated by wells. A further object is to provide a method for plugging off gas entering oil wells. A more specific object is to provide a method for increasing the degree of plugging provided by solutions of asphalt. A still more specific object is to provide an improved method for asphalt plugging of a gas zone containing a small amount of residual oil. Other objects will be apparent from the following description and claims.

In general, I accomplish the objects of my invention by injecting a solution of asphalt into a formation, such as a gas zone, penetrated by a well, such as an oil well, and mixing this solution with acetone injected before and/or after the asphalt solution. I have found that acetone, when mixed with solutions or dispersions of asphalt in oil produces a type of precipitate or reaction product completely unlike that produced by any other type of diluent.

For example, when highly asphaltic crude oil, such as that from the Pollard Field of Alabama, is mixed with pentane, a single liquid phase forms and the asphaltenes are precipitated as almost crystalline solid particles. When methanol is used as the diluent, two liquid phases are formed. The methanol remains substantially colorless and the volume of oil remains almost unchanged. There is no visible precipitate. When acetone is added to Pollard crude, however, the acetone becomes amber to black in color, depending upon the amount of acetone used. The volume of the crude oil is decreased. The oil also becomes much more viscous and sticky. The volume is many times that of the substantially crystalline asphaltenes precipitated by pentane. As a result of the nature and volume of the thick sticky mass produced by acetone treatment, a plugging operation comprising alternate injections of asphalt solution and acetone produces a much more effective asphalt plug than that produced by other diluents.

The effects of other ketones as diluents should also be considered. When methyl ethyl ketone is added to a solution of asphalt in hydrocarbons, a single liquid phase is formed. The liquid is quite black and opaque, but has a lower viscosity than before the ketone was added. The precipitate which forms is similar in amount and type to that produced by pentane. Therefore, it will be apparent that acetone is unique in its action, and is the only ketone which can be employed as a diluent for asphalt solutions in plugging gas zones of oil wells if its characteristic superior results are to be obtained.

Small amounts, up to about 5 percent, of solvents such as carbon tetrachloride, carbon disulfide, and the like may be present in either the asphalt solution or the acetone. These solvents will decrease slightly the volume of the semisolid mass which is produced by contacting the acetone and asphalt solution. Since the volume of this mass is normally rather large, however, a little loss in volume is not serious. The ability of the process to tolerate small amounts of strong solvents may be important for two reasons. First, it permits the use of the less expensive, relatively impure technical grades of acetone which may contain small amounts of such solvent. Second, it permits use of solvents such as carbon tetrachloride with the asphalt solutions. Such solvents dissolve some of the asphaltene particles which may have been formed by coagulation of the colloidal material. These solvents also inhibit premature precipitation of asphaltenes near the well bore during injection of the asphalt solution into the gas-bearing zone. Premature decrease in permeability of the formation may thus be avoided and injection of treating solutions correspondingly facilitated.

The solvent for the asphalt in the asphalt solution should be a hydrocarbon or a mixture of hydrocarbons. An aromatic hydrocarbon, such as benzene, may be employed. Preferably, however, an aliphatic hydrocarbon should be used. The most suitable solvent is a refined petroleum fraction, preferably distilled, such as kerosene or diesel fuel. Gasoline can be regarded as operable, but is not quite so satisfactory as the higher boiling fractions. In general, the solvent should contain few, if any, aliphatic hydrocarbons containing less than about 10 carbon atoms per molecule. The lighter aliphatic hydrocarbons should be avoided since they tend to cause premature precipitation of asphaltenes before or during injection of the asphalt solution into the gas-bearing zone. As previously noted, the solvent may contain up to about 5 percent of a non-hydrocaron solvent, such as carbon tetrachloride.

The preferred solvent should have a 10 percent boiling point of at least about 400° F. and a 90 percent point of no more than about 650° F. in a standard ASTM distillation as described in ASTM Tests D86–56 and D158–54.

Many crude oils are satisfactory as asphalt solutions for use in my process. Crude oil from the Pollard Field of Alabama has already been mentioned. Other suitable crudes include those from the Grass Creek Field in Wyoming, the Little Buffalo Basin Field in Wyoming, and the Roosevelt Field in Utah. If the temperature of the formation to be plugged is low, if the problem is not too serious, and if a highly asphaltic crude oil is available at a low cost, use of the asphaltic crude oil as the asphalt solution may be advisable. In most cases, however, use of a solution prepared by dissolving asphalt in diesel oil, kerosene, or the like will be justified in spite of the somewhat greater cost.

By preparing an asphalt solution from known ingredients, the quality and amount of asphalt can be closely controlled. In addition, the nature of the solvent can also be controlled. This may be very important. A crude oil normally contains at least small amounts of light hydrocarbons which, as previously noted, tend to cause premature precipitation of asphaltenes. These light hydrocarbons also tend to dissolve some of the maltenes which might otherwise remain with the asphaltenes and aid in the plugging operation. Crude oils also contain considerable amounts of hydrocarbons in the molecular weight range between that of kerosene or diesel fuel and that of the lightest maltenes in the asphalt. These tend to act as mutual solvents for the maltenes, asphaltenes, and acetone and thus change the volume and nature of asphalt in the acetone-insoluble phase.

A preferred asphalt solution can be prepared by use of about 25 parts of an asphalt having a softening point of at least about 190° F., and preferably of about 200° F., and about 75 parts of diesel oil or kerosene. Softening points should be determined by the ASTM ball and ring method D36–26. The asphalt should be heated to a temperature of about 250 to 300° F. to facilitate mixing. The kerosene can then be added with stirring. The blending operation can be carried out in the field at the well to be treated. It is generally preferred, however, to prepare the cut-back asphalt at a petroleum refinery or at a central location where heating and mixing facilities are more readily available. The solutions, once prepared, are normally quite stable and can be stored for extended periods of time and shipped long distances without difficulty.

Another convenient form of asphalt dispersion can be produced by topping an asphalt base crude oil to remove most of the low boiling hydrocarbons and to increase the concentration of asphaltenes in the remaining oil. If the topped crude petroleum is too viscous, it can be diluted with a relatively high boiling petroleum fraction such as kerosene or diesel fuel.

From the foregoing description, it will be apparent that the composition of the acetone and asphalt solution can vary considerably and still meet my requirements. When the term "consisting essentially of" is used in connection with asphalt solutions or acetone, it should be interpreted to mean the asphalt solution or acetone plus any other materials which do not substantially affect the ability of the asphalt solution or acetone to decrease the permeability of a formation when the asphalt solution and acetone are injected into the formation.

The preferred form of asphalt solution has one very great advantage over asphaltic crude oils. The absence of light and heavy aliphatic hydrocarbons in the specially prepared solutions makes possible plugging zones containing up to 10 or 15 percent of residual crude oil. That is, the volume of crude oil may be sufficient to fill 10 or 15 percent of the pore volume of the formation. The presence of even 5 percent residual crude oil in a gas zone can greatly decrease the efficiency of plugging afforded by a treatment of acetone and many asphaltic crude oils. Since many gas-producing zones contain small amounts of oil, this can be a serious problem. The specially prepared solutions, however, can tolerate rather large amounts of crude oil before the crude oil greatly affects the plugging efficiency. Larger amounts of oil will decrease the efficiency of plugging of even the specially prepared asphalt solutions. This is fortunate and important since it means that, if the asphalt solution and acetone are injected into an oil-producing zone, sufficient permeability remains to permit flow of oil which eventually dissolves away the asphalt and restores the permeability of this zone. In a two-stage treatment in which more than one batch of asphalt solution and acetone are injected into the formation, it may be desirable to produce the well for a short time between stages to wash the asphalt out of the oil zone and thus avoid plugging the oil zone to a high degree.

If the asphalt solution is prepared by dispersing asphalt in a solvent, there is no question that the resulting solution is satisfactory for my purposes. If the asphalt solution is a crude oil or topped crude oil, however, there may be some question of its effectiveness in my process since not all crude oils are asphaltic. The U.S. Bureau of Mines has done considerable work with asphaltic crude oils and has devised a method for determining the actual asphaltene content of asphalts. The method is described in Technical Paper 717, United States Department of the Interior, Bureau of Mines, page 8, 1949. This method can be applied to crude oils to determine not only if they are asphaltic but also to determine the asphaltene content. If a crude oil contains asphaltenes by this method, the oil should be considered an asphalt solution for my purposes. For good results the asphaltene content should be at least about 5 percent as determined by this test. A simpler test is to dilute one volume of the asphalt solution with about nine volumes of pentane. If a precipitate forms, it is proof that the solution contains asphalt and is suitable for my purposes. The volume of the precipitate after decanting the pentane and drying the precipitate over a steam bath should be at least about 10 percent of the volume of the original oil for best results. The value specified is higher in this test than in the Bureau of Mines test due to the less effective extraction of pentane-soluble materials in the simpler test.

In applying my method to a well, the acetone should usually be injected into the formation ahead of the asphalt solution. This is particularly true if the gas zone to be treated is closely associated with an oil zone in an oil-producing well. In this case it is important that the oil zone be plugged as little as possible. Whether the acetone or asphalt solution is injected first, most of the liquid will enter the gas zone since the injected liquid can displace the gas much more easily than it can displace the oil. If the acetone is injected first, however, and it does enter the oil-producing zone, it will have some tendency to flow over the oil due to the higher density of the oil. In addition, the acetone will have a somewhat lower viscosity than the crude oil in the formation. Therefore, the acetone will tend to penetrate the oil and mix with the oil. Then, when the asphalt solution is injected, the mixture of oil and acetone will have much less tendency to form a precipitate with the asphalt solution than will the straight acetone in the gas zone.

If, on the other hand, the asphalt solution enters an oil zone first, there will be little tendency to flow over the oil since the densities of the solution and oil will be approximately the same. In addition, the viscose solution will not tend to penetrate and mix with the less viscous crude oil. Instead, the oil will be displaced ahead of the asphalt solution. Then, when the acetone is introduced, both the acetone and asphalt solution will be uncontaminated. Thus, they will form a precipitate just as they do in the gas zone. Even in this case the plug in the oil zone will extend from the well to a much smaller distance than it does in the gas zone, but it will be a more complete plug than if the acetone had been injected first.

Even if the gas zone is isolated, the acetone should be injected first. The more viscous asphalt solution then displaces the acetone into the formation with less contact and resulting plugging action than if the asphalt solution is displaced into the formation ahead of the less viscous acetone. Thus the treating liquids can be injected more easily to a greater distance from the well if the acetone is injected first.

The volume of acetone injected into the formation should be at least about 20 percent of the volume of asphalt solution. This minimum limit is necessary to insure adequate contact of the liquids. Preferably, the volume of acetone should be about 50 or 60 percent of the volume of the asphalt solution. Larger amounts of acetone may be used to remove residual oil from the formation and thus promote a more effective plugging action. Not more than about twice as much acetone as asphalt solution should be used except in unusual cases. This is particularly important if an asphaltic crude oil is used as the asphalt solution.

All of one liquid, either the acetone or asphalt solution, may be injected into the formation before any of the second liquid is injected. However, if large volumes are involved, it will be apparent that a considerable amount of the last liquid to be injected may flow back into the well without being contacted by the first liquid. To avoid this difficulty the two liquids may be injected in small, alternate slugs. It may be advisable to use small volumes of liquids, such as kerosene, between at least the first batches of acetone and asphalt solution in order to avoid excessive contact near the well bore with consequent plugging action and increased difficulty of injection. These same volumes of spacer liquid also separate the two treating liquids in the tubing to avoid mixing and consequent asphalt precipitation before the liquids enter the formation. Spacers of other liquids such as water or solid spacers such as rubber may also be used to separate the batches of diluent and asphalt dispersions in the tubing. Preferably, solid plugs should be oil soluble such as paraffin wax or water soluble such as rock salt, so that they will eventually be dissolved and removed from the well.

Sufficient treating liquids should be used to form a plug extending at least about 5 feet from the well. Otherwise, the length of the plugged zone is so short compared to the total flow path of gas to the well that plugging of the zone around the well has only a minor effect on the rate of flow of gas to the well. In order to form a plug extending an effective distance from the well the quantity of asphalt solution should usually be about 50 to 100 gallons per foot of exposed formation. In some cases as little as 10 gallons per foot will produce desirable results. In other cases, use of more than 100 gallons per foot may be justifiable.

Usually the asphaltic solution and the acetone should be introduced down the tubing with a packer or retainer set between the tubing and casing to prevent contamination of the treating liquids by liquids in the annular space above the zone to be treated. A packer may also be set below the zone to be treated. Other means of isolating limited zones to be treated will occur to those skilled in the art. For example, a liquid, preferably lighter than the treating liquids, may be pumped down the annular space between the tubing and casing while the treating solution is pumped down the tubing. Use of two packers or other means to isolate a zone only 10 or 20 feet long is particularly advisable if a long section of formation is exposed. That is, long secitons should preferably be treated about 10 or 20 feet at a time. The asphalt solutions are usually viscous so the rate of injection should be controlled to avoid developing pressures sufficient to fracture the formation. While my method will normally seal a fracture, particularly if it is packed with sand, fractures are undesirable because they take a large proportion of the asphalt solution, leaving little for plugging the matrix permeability to the desired distance from the well. To decrease the danger of fracturing, the viscosity of the asphalt solution should preferably be no more than about 100 centipoises.

Sometimes the asphalt solution contains undispersed solids. For example, in an asphalt base crude oil to be used as the asphalt solution, some of the asphaltenes may have coagulated. The crude oil may also contain finely divided mineral matter. Such undispersed solids usually filter out on the face of the formation. In most cases the quantity of such solids is insufficient to increase seriously the difficulty of forcing the asphalt dispersion into the formation. If the amount of undispersed solids is great, however, the large solid particles should be allowed to settle out of the dispersion if they will. In case settling is inadequate, the asphalt dispersion may be filtered by any suitable means. Several suitable filters are described in *Chemical Engineers' Handbook*, third edition (1950), by John H. Perry. For example, plate and frame filters are described on pages 971 to 976 and continuous filters are shown on pages 976 to 983. Centrifuges may also be employed although their use is seldom justified. As previously noted, a small volume of solvent for the asphaltenes may help in redispersing any asphaltenes which have flocculated.

My method has been described to this point principally as it applies to plugging gas zones. It wil be apparent, however, that the method is also applicable to plugging water-bearing zones penetrated by wells. This may be desirable in producing wells as well as in drilling operations, particularly in drilling with air as the circulating fluid. Since both the fluids necessary for forming the precipitate are injected, the method decreases the permeabilities of all types of formations regardless of the nature of the fluid content.

My invention will be better understood from consideration of the following examples.

EXAMPLE I

The ability of acetone and an asphaltic crude oil to plug a formation was tested as follows. A core 2 inches in diameter and about 30 inches long was drilled parallel to the bedding planes from a sample of the Berea sandstone formation obtained where the formation outcrops near Amherst, Ohio. This core was mounted in a rubber sleeve around which pressure could be applied to seal the sleeve to the core. The ends of the sleeve were clamped in housings which permitted fluids to be injected in one end of the core and withdrawn from the other. The permeability of the clean, dry core to flow of methane was determined to be 224 millidarcys. The pore volume of the core was calculated from a pore volume determination made on a small sample taken from the formation near the core. A volume of acetone equal to 36 percent of this pore volume was then injected into the core. This was followed by a volume of crude oil equal to 50 percent of the pore volume. The crude oil was from the Pollard Field in Alabama. Tests had previously shown this crude oil to produce 20 percent by volume of precipitate upon dilution with pentane. Methane was next injected to cause reversal of flow of the acetone and crude oil in the core. Permeability to flow of the methane was again measured when stabilized conditions were observed. The results are shown in Table A, together with results obtained using other ratios of acetone to crude Table A
INJECTION SEQUENCE: ACETONE FOLLOWED BY POLLARD CRUDE OIL

| Acetone injected, percent pore vol. | Crude injected, percent pore vol. | Injectivity index [1] | Core permeability | | Permeability reduction, percent |
|---|---|---|---|---|---|
| | | | Initial | Final [2] | |
| 36 | 50 | .558 | 224 | .05 | 99.9 |
| 20 | 50 | .425 | 222 | 11.37 | 94.9 |
| 50 | 30 | .935 | 102 | 11.00 | 89.2 |
| 20 | 30 | .800 | 101 | 14.50 | 85.6 |
| 50 | 30 | .685 | 198 | 125.00 | 36.9 |

INJECTION SEQUENCE: POLLARD CRUDE FOLLOWED BY ACETONE

| 50 | 30 | 2.060 | 220 | 47.50 | 78.4 |

[1] Injectivity index equals total volume of crude oil injected divided by the injection time and divided by the pressure differential causing flow through the cross-sectional area of the core. This index is calculated using only the volume of asphalt solution and the time required to inject this solution.

[2] Permeability of invaded zone only, not of entire core.

Calculated by the formula $$\frac{L_1}{K_1} + \frac{L_2}{K_2} = \frac{L_T}{K_T}$$

where
$L_1$ is length of core invaded by asphalt solution.
$K_1$ is permeability of the invaded length.
$L_2$ is length of core not invaded by asphalt solution.
$K_2$ is original permeability of core.
$L_T$ is total length of core.
$K_T$ is total over-all permeability of the core.

oil, other injection sequences, and other cores. The cores having an initial permeability of around 200 millidarcys were all Berea cores. Those having a permeability of about 100 millidarcys were Torpedo sandstone cores obtained from an outcrop in Oklahoma.

The data in Table A show that plugging can be obtained in cores of various permeability using an asphaltic crude oil as the asphalt solution. The data show that either the acetone or the asphalt solution may be injected first. The erratic results obtained when using more acetone than asphalt solution should be noted. These provide the basis of the recommendation that not more than about twice as much acetone as asphalt solution should be used except in unusual cases. The second test in the table shows the good plugging action which occurs when as little as 40 percent as much acetone as asphalt solution is used. The results indicate that fair plugging should be obtainable by use of even lower ratios of acetone to asphalt solution. The injectivity indexes are included for comparison to values for other asphalt solutions and will be commented upon when the comparison is made in Example V.

EXAMPLE II

To determine the effects of adding a solvent to the asphalt solution, various amounts of carbon tetrachloride were mixed with Pollard crude and injected into Berea sandstone cores following acetone as described in Example I. The results are presented in Table B.

Table B

| Acetone injected, percent pore vol. | Crude and CCl₄ | | Injectivity index¹ | Core perm., md. | | Permeability reduction, percent |
|---|---|---|---|---|---|---|
| | Percent by weight CCl₄ | Injected, percent pore vol. | | Initial | Final² | |
| 36 | 0 | 50 | 0.56 | 224 | .05 | 99.9 |
| 36 | 5 | 50 | 4.12 | 150 | 4.25 | 97.0 |
| 36 | 10 | 50 | 15.30 | 360 | 166.04 | 54.0 |

¹ Defined in Table A.
² Permeability of invaded zone only, not of entire core.

The data in Table B demonstrate that, by use of a little solvent such as carbon tetrachloride in an asphalt solution, the ease of injecting the solution into the formation is greatly improved. These data also indicate, however, that the plugging efficiency is seriously decreased if more than about 5 percent of such solvent is present.

EXAMPLE III

Since the gas zone to be plugged may contain some oil, tests were made to determine the effects of various amounts of oil in cores plugged by acetone and solutions of asphalt. The results are presented in Table C. All cores were from the Berea sandstone. The reported oil saturations were established by wrapping the cores in rags wet with kerosene and permitting the cores to imbibe the kerosene. The amount of oil was determined by weighing the cores before and after the soaking operation. In treating the first three cores Pollard crude oil was used as the asphalt solution. In treating the last three cores the asphalt was prepared by dissolving medium grade Parolite in diesel oil. Parolite is a trademark for asphalts. Medium grade Parolite has a softening point of about 190 to 200° F. and an asphaltene content by the Bureau of Mines method previously mentioned of about 36 percent.

It will be apparent that a little residual oil may decrease the plugging action produced by asphaltic crude oils. Even in cases where a single stage treatment produces poor plugging, however, it will be apparent that a second stage treatment will provide a satisfactory plug. The Parolite solutions obviously formed satisfactory plugs even when the cores had up to 15 percent of their pore volumes filled with oil.

EXAMPLE IV

In view of the results reported in Table C, a test was run to determine if solutions of Parolite and diesel oil might form complete and permanent plugs in oil-producing zones of wells. In this test a core was saturated with kerosene, after which it was treated with acetone amounting to 31 percent of the pore volume of the core and an asphalt solution amounting to 50 percent of the pore volume. The kerosene saturation in this case was provided by injecting kerosene into one end of the core until it appeared at the other end. The asphalt solution contained 25 percent by weight of medium grade Parolite as described in Example III and 75 percent diesel oil. After the plugging treatment a back-flow of kerosene was established. The results of the tests are presented in Table D.

Table D

| Pore volumes back-flowed | Permeability, md.¹ | Percent of original permeability² |
|---|---|---|
| 6 | 138 | 76.9 |
| 9 | 142 | 78.8 |
| 12 | 169 | 93.8 |
| 15 | 177 | 98.3 |

¹ Original permeability to kerosene was 180 md.
² Applies to invaded zone only, not entire core.

The data in Table D show that a complete plug is not formed in the oil-producing zone of the formation and that flow of oil removes the partial plug.

*Example V*

Several hydrocarbon solvents for asphalts were tested by mixing asphalt into the solvents and using the solutions and acetone to plug cores. In every case the asphalt was medium grade Parolite as defined in Example III. The results of the tests are presented in Table E. The concentration of asphalt in the solvent was 25 percent by weight in every case.

Table C

| Core No. | Oil in core, percent pore vol. | Acetone injected, percent pore vol. | Asphalt solution injected, percent pore vol. | Core perm., md. | | Permeability reduction, percent |
|---|---|---|---|---|---|---|
| | | | | Initial | Final¹ | |
| 1 | 0 | 36 | ²50 | 224 | .05 | 99.9 |
| 2 | 5 | 36 | 50 | 227 | 75.38 | 66.7 |
| 3 | 15 | 36 | 50 | 332 | 163.70 | 50.7 |
| Retreatment of core 3 | 15 | 36 | 50 | | 10.11 | 97.0 |
| 4 | 0 | 30 | ³50 | 225 | .16 | 99.9 |
| 5 | 5 | 30 | 50 | 205 | .07 | 99.9 |
| 6 | 15 | 30 | 50 | 161 | .05 | 99.9 |

¹ Permeability of invaded zone only, not of final core.
² Pollard crude oil used in cores 1, 2, and 3.
³ Cut-back asphalt is 25% Parolite and 75% diesel oil and was used in cores 4, 5, and 6.

Table E

| Acetone injected, percent pore vol. | Asphalt solution | | Inject. index | Core perm., md. | | Permeability reduction, percent |
|---|---|---|---|---|---|---|
| | Solvent | Amt. inject., percent pore vol. | | Initial | Final | |
| 30 | Kerosene | 50 | 10.73 | 271 | .34 | 99.9 |
| 30 | Gasoline | 50 | 5.17 | 237 | .05 | 99.9 |
| 30 | Diesel oil | 50 | 8.95 | 225 | .16 | 99.9 |
| 25 | Benzene | 75 | 2.74 | 243 | .05 | 99.9 |
| 50 | do | 50 | .82 | 282 | .05 | 99.9 |
| 10 | do | 45 | .35 | 243 | .05 | 99.9 |

The suitability of petroleum fractions even as low boiling as gasoline is apparent from the tests. The suitability of benzene as the asphalt solvent is also to be noted. The benzene solutions, however, were considerably more difficult to inject into the formation than even the solution in gasoline. Asphalt solutions in diesel oil and kerosene were injected most easily. These injectivity indexes should be compared to those of Pollard crude as shown in Tables A and B. Pollard crude oil is obviously much more difficult to inject into formations than specially prepared solutions. Thus, the special solutions can be placed in the formation in a much shorter time with less danger of fracturing.

EXAMPLE VI

The distribution of the plug deposited in a core was determined by sawing the core into segments and measuring the permeability of each segment. The core was plugged by injecting 36 percent of the pore volume of acetone and 50 percent of the pore volume of a solution consisting of 25 percent by weight of medium grade Parolite, as described in Example III, and 75 percent diesel oil. The original core was 72 centimeters long and had an over-all permeability of 148 millidarcys. The results of the tests are reported in Table F.

Table F

| Plug No. | Distance from well bore, cm. | Permeability, md. | Permeability reduction, percent |
| --- | --- | --- | --- |
| 1 | 1.27 | <0.05 | 99.9+ |
| 2 | 2.54 | <0.05 | 99.9+ |
| 3 | 5.08 | <0.05 | 99.9+ |
| 4 | 10.60 | 2.07 | 98.6 |
| 5 | 15.68 | .82 | 99.4 |
| 6 | 20.76 | .94 | 99.4 |
| 7 | 25.84 | 1.25 | 99.2 |
| 8 | 30.92 | .38 | 99.7 |
| 9 | 36.00 | .44 | 99.7 |
| 10 | 41.08 | 96.62 | 34.8 |
| 11 | 46.16 | 106.03 | 28.4 |
| 12 | 51.24 | 142.42 | 3.8 |
| 13 | 56.32 | 138.03 | 6.8 |

Since enough cut-back asphalt was injected to fill half the pore volume, the plug should have extended about half the length of the core. Actually, a little plugging occurred beyond this point. This is probably because the acetone partly filled some of the pore volume in the first half of the core, causing the asphalt solution to penetrate to a distance greater than 50 percent of the core length. All but one of the segments in the first half of the core had permeabilities reduced more than 99 percent. This consistent action throughout the volume of the core flooded with asphalt solution is important since it insures a more effective plugging action than would be the case if the plugging action was somewhat erratic in nature.

I claim:
1. A method for decreasing the permeability of a formation penetrated by a well comprising injecting acetone and an asphalt solution separately into said formation, the volume of said acetone being at least about 20 percent of the volume of said asphalt solution.
2. The method of claim 1 in which said asphalt solution has a viscosity less than about 100 centipoises to decrease the tendency to fracture the formation.
3. The method of claim 1 in which the injection of acetone and asphalt solution into the formation is repeated to increase the degree of plugging.
4. The method of claim 1 in which said asphalt solution is a solution of an asphalt in a petroleum fraction having a 10 percent point of at least about 400° F. and a 90 percent point of no more than about 650° F. in a standard ASTM distillation.
5. The method of claim 4 in which said asphalt has a softening point of at least about 190° F.
6. A method for selectively decreasing the permeability of a gas-producing zone of an oil-producing formation comprising injecting acetone and an asphalt solution separately into said formation, the volume of said acetone being at least about 20 percent of the volume of said asphalt solution, and finally producing said well whereby oil flowing through the partially plugged oil zone removes the asphalt from the oil zone and restores the permeability to flow of oil.
7. The method of claim 6 in which the injection and producing steps are repeated to form a more complete plug of said gas-producing zone while said oil zone retains substantially its original permeability.

References Cited in the file of this patent
UNITED STATES PATENTS

| 2,146,480 | Kennedy | Feb. 7, 1939 |
| 2,223,789 | Limburg | Dec. 3, 1940 |
| 2,713,906 | Allen | July 26, 1955 |